US008102790B1

(12) United States Patent
Trehus (10) Patent No.: US 8,102,790 B1
(45) Date of Patent: Jan. 24, 2012

(54) SAVING POWER IN A WIRELESS NETWORK IN THE PRESENCE OF MULTICAST OR BROADCAST DATA

(75) Inventor: Eric M. Trehus, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 872 days.

(21) Appl. No.: 11/735,186

(22) Filed: Apr. 13, 2007

(51) Int. Cl.
G08C 17/00 (2006.01)

(52) U.S. Cl. ........ 370/311; 455/574; 455/41.1; 370/338

(58) Field of Classification Search .................. 370/311, 370/338; 455/574, 41.1–41.3
See application file for complete search history.

(56) References Cited

U.S. PATENT DOCUMENTS

| 6,445,936 | B1 * | 9/2002 | Cannon et al. ............... 455/573 |
| 6,628,972 | B1 * | 9/2003 | Lee ............................. 455/574 |
| 6,735,200 | B1 * | 5/2004 | Novaes ......................... 370/390 |
| 2003/0050955 | A1 * | 3/2003 | Eatough et al. ............... 709/201 |
| 2004/0258102 | A1 * | 12/2004 | Callaway et al. ............. 370/511 |
| 2005/0009512 | A1 * | 1/2005 | Rue .............................. 455/420 |
| 2005/0114537 | A1 * | 5/2005 | Griswold et al. ............. 709/231 |
| 2005/0201341 | A1 * | 9/2005 | Griswold ...................... 370/338 |
| 2005/0254444 | A1 * | 11/2005 | Meier et al. .................... 370/312 |

OTHER PUBLICATIONS

IEEE Computer Society, Information Technology-Telecommunications and Information Exchange Between Systems-Local and Metropolitan Area Networks-Specific Requirements—Part 11: Wireless LAN Medium Access Control (MAC) and Physical Layer (PHY) Specifications, Reaffirmed Jun. 12, 2003, 528 Pages, Std. 802.11, 1999 Edition.

* cited by examiner

Primary Examiner — Lester Kincaid
Assistant Examiner — Daniel Lai
(74) Attorney, Agent, or Firm — Stolowitz Ford Cowger LLP (57) ABSTRACT

In one embodiment, when conditions are observed a wireless device keeps its radio circuitry powered down during a designated transmission window orchestrated by an associated Access Point (AP) for forwarding buffered broadcast and multicast data to reduce power consumption by the wireless device. The wireless device then temporarily powers up its radio circuitry to receive a beacon outside the designated transmission window. When the received beacon indicates buffered data, the wireless device transmits a request for a unicast transmission of the buffered data from the AP.

25 Claims, 5 Drawing Sheets

FIG. 5

SAVING POWER IN A WIRELESS NETWORK IN THE PRESENCE OF MULTICAST OR BROADCAST DATA

TECHNICAL FIELD

The present disclosure relates generally to the field of wireless networking.

BACKGROUND

Wireless stations such as mobile phones and other wireless devices have limited battery life. Accordingly, these wireless devices have been designed to power down certain internal components at certain times to extend battery life.

For example, it is known that a wireless device powers down internal radio circuitry between transmissions from an associated Access Point (AP) or other relaying device for minimizing power usage. However, currently both the frequency of the temporary radio circuitry power ups and the duration of the temporary radio circuitry power ups periods limit the effectiveness of this power saving technique. The disclosure that follows solves this and other problems.

DESCRIPTION OF EXAMPLE EMBODIMENTS

Overview

In one embodiment, when conditions are observed a wireless device keeps its radio circuitry powered down during a designated transmission window orchestrated by an associated Access Point (AP) for forwarding buffered broadcast and multicast data to reduce power consumption by the wireless device. The wireless device then temporarily powers up its radio circuitry to receive a beacon outside the designated transmission window. When the received beacon indicates buffered data, the wireless device transmits a request for a unicast transmission of the buffered data from the AP.

DESCRIPTION

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

Figure 1:
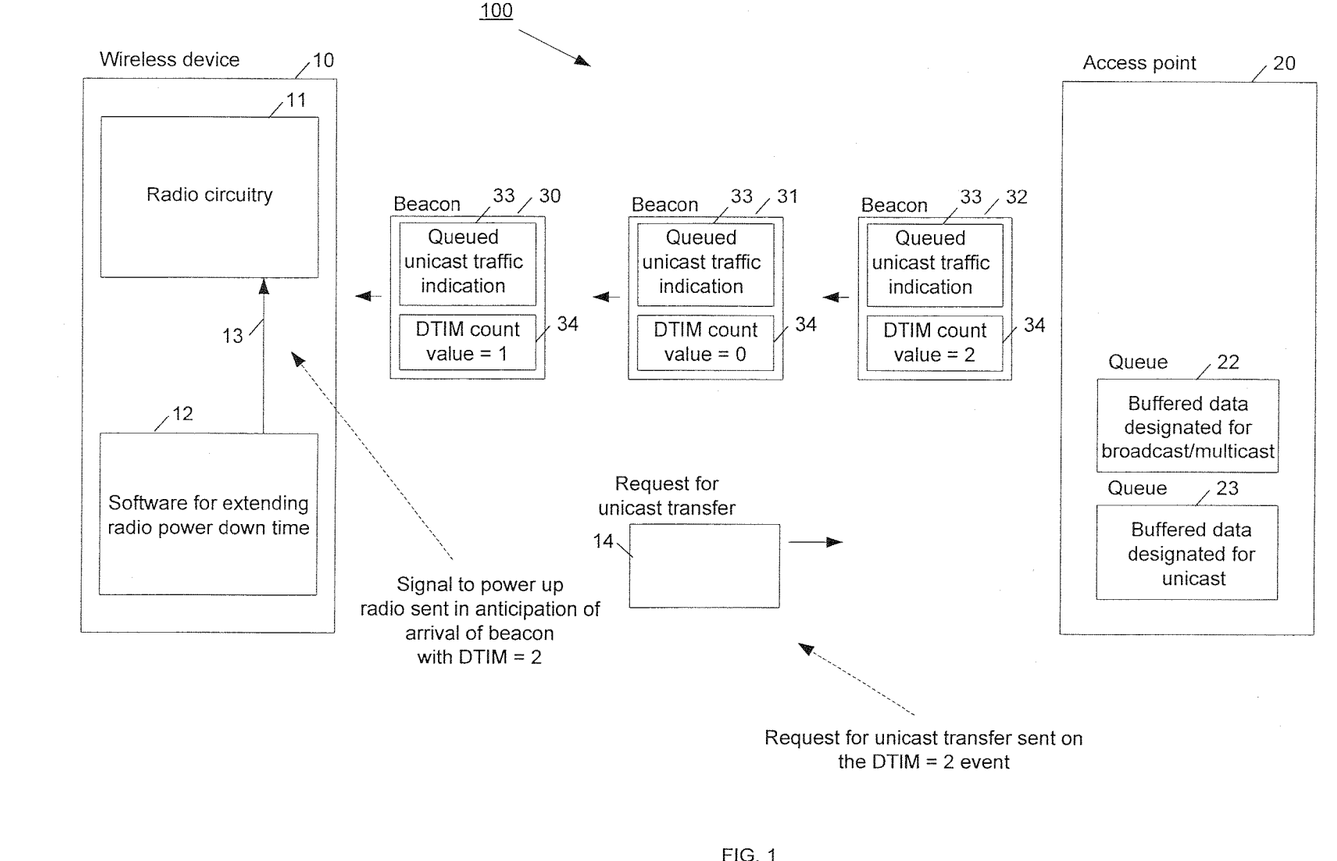
FIG. 1 illustrates an example wireless device for extending radio circuitry power down times to minimize power usage.

FIG. 1 illustrates an example wireless device for extending radio circuitry power down times to minimize power usage. The system 100 includes a wireless endpoint such as wireless device 10 and a relaying device such as Access Point (AP) 20. The wireless device 10 in this example includes software 12 for extending power down times of components such as radio circuitry 11 thereby reducing power usage. In other examples, logic may be used to perform the functions of software 12. An example operation of the wireless device 10 follows to illustrate how the wireless device 10 reduces power usage.

In the example, the wireless device 10 is associated with an 802.11 protocol AP 20 that buffers traffic in a queue 22 to be distributed to associated STAtions (STAs) including the wireless device 10 using multicast/broadcast during certain orchestrated periods. The AP 20 transfers synchronizing signals such as beacons 30, 31 and 32 for tracking a Delivery Traffic Indication Message (DTIM) count that is used for synchronizing multicast or broadcast transfer of data buffered by the AP 20 in queue 22. It is noted that the beacons are shown as simultaneously in the air for illustrative purposes only; in typical systems only one of these beacons from the AP 20 may be present in the air at any given instant.

In this specific example, each of the beacons 30, 31 and 32 include traffic indication messages 34 having different DTIM count values. A DTIM interval defines a starting point for the DTIM count, which decreases by one with each one of the beacons. In the system 100, the DTIM interval is selected to be three so that the DTIM count begins at two (initial beacon not shown) and then progresses to one at beacon 32 and then to zero at beacon 31. The beacon 32 renews the count with a DTIM value of two. The beacons 30, 31 and 32 also include fields 33 indicating that there is buffered unicast traffic in the queue 23 awaiting unicast transfer to the wireless device 10. Only one queue 23 is shown for brevity; in actual systems there may be multiple unicast queues on the AP 20 to correspond the associated STAs.

The occurrence of the DTIM-zero synchronization event is essentially a synchronization request by the AP 20 for the associated STAs such as wireless device 10 to cooperate and synchronize with a multicast transfer. Conventional STAs automatically power up their respective radio circuitry in anticipation of the arrival of beacons identifying DTIM-zero events so that they are able to receive these beacons. The acts of powering up radio circuitry and synchronizing using the beacon having the DTIM-zero event allow these conventional wireless devices to receive an unsolicited push of buffered multicast and/or broadcast traffic from the AP 20. When the STAs power up these components, it is conventional for the STAs to also pull unicast traffic indicated by the field 33 in the beacon 31 before powering the radio circuitry 11 back down. The unicast transmission of the buffered data from queue 23 conventionally occurs successively after the AP 20 is finished processing the broadcast/multicast transmission of the buffered data in the queue 22.

The software 12 causes the wireless device 10 to keep the radio circuitry 11 powered down through the DTIM zero event when certain conditions are present. In other words, the wireless device 10 does not power up the radio circuitry 11 in anticipation of the arrival of beacon 31 having the DTIM-zero count when certain conditions are present. One condition is whether the DTIM interval is greater than one such that the AP 20 sends beacons having non-zero DTIM values such as beacons 30 and 32. The wireless device 10 may observe any beacon to determine the DTIM interval. Alternatively the wireless device 10 may exchange communications with the AP 20 to determine the DTIM interval, for example the wireless device 10 may send a probe request to solicit a probe response that contains a traffic indication message element identifying the DTIM interval.

In other embodiments where the synchronization signals do not include DTIM values, this condition may include determining whether the relaying device sends more than one type of synchronization signal. In these embodiments, the wireless device 10 keeps the radio circuitry 11 powered down for designated multicast transfer periods when the AP 20 sends both synchronization signals for synchronizing multicast transmissions and other synchronization signals that do not synchronize multicast transmissions.

Another condition is whether the multicast or broadcast data in the queue 22 is needed by the wireless device 10 or whether the wireless device 10 is joined in any multicast groups. The wireless device 10 may observe whether this condition is satisfied by determining whether filters in the wireless device 10 are set to filter out multicast traffic from the AP 20. In other examples, the wireless device 10 may access a user setting indicating whether or note multicast traffic is desired. In yet other examples, the wireless device 10 may empirically analyze a history of received multicast traffic to determine whether new multicast data is needed. In yet other examples, this condition may be satisfied when the wireless device 10 determines that it is not set to receive multicast service such as when it is not a member of one or more multicast groups such as those for receiving Push to Talk service or those for receiving multicast music when on hold. In yet other examples, the wireless device 10 may exchange signaling with any remote device to determine whether the multicast is needed. In any of these examples, the wireless device 10 may receive any type of input that indicates whether or not multicast traffic is desired.

In some examples, to determine whether or not multicast traffic is desired, a lowest layer associated with powering up the radio circuitry 11 uses information from a higher layer indicating whether multicast traffic is needed. When multicast traffic is not needed, before the lowest layer powers down for power savings, the lowest layer schedules power up to reoccur outside an expected time for a DTIM zero event.

Another condition is whether the wireless device 10 is associated with an AP 20 capable of handling proxy Address Resolution Protocol (ARP) messages. When the AP 20 is proxy ARP capable, the AP 20 responds to ARP requests or other address resolution requests on behalf of the wireless device 10. The proxy ARP capability means the AP 20 will process ARP requests itself instead of forwarding those ARP requests to the wireless device 20 at the DTIM zero event.

In the present example, when the above conditions are satisfied the software 12 causes the wireless device 10 to keep the radio circuitry 11 powered down regardless of anticipation of the DTIM-zero event. The software 12 may block an attempt by the wireless device 10 to power up the radio circuitry 11 or use some other means (such as not sending a signal) for preventing power up. For example, the software 12 may prevent power up at this time by calculating when DTIM zero events will occur and then scheduling power up of the radio circuitry at other times. Accordingly, the wireless device 10 does not receive any of the buffered data from the queue 22 and does not request the buffered data 23 during the designated transfer period. In other examples, the occurrence of only one of the above conditions or functionally similar conditions may cause the software 12 to prevent power up.

Shortly before arrival of another beacon indicating a non-zero DTIM count in the field 34, the wireless device 10 sends a signal 13 requesting power up of the radio circuitry 11 allowing the beacon synchronizing the non-zero DTIM event to be received. The software 12 also may send a request 14 for unicast transfer of the buffered data from queue 23. The request 14 may be a Power Save Poll (PS-Poll) frame or a Trigger Frame in the case of Unscheduled Automatic Power Save Delivery (U-APSD).

In the above example, the wireless device 10 powers up the radio circuitry 11 in anticipation of arrival of the beacon 32 indicating a DTIM value of two. In other examples, the wireless device 10 may instead periodically power up in anticipation of other non-zero DTIM events such as every DTIM count of three, or every other DTIM count of three, etc. The wireless device 10 may also power up its radio circuitry 11 in anticipation of non-zero DTIMs events using an irregular schedule. Also, it should be understood that regardless of which non-zero DTIM event the wireless device 10 is scheduled to send the signal 13 the software 12 may forgo sending the signal 13 and immediately power back down the radio circuitry 11 if the beacon does not indicate the presence of buffered unicast traffic on the AP 20.

It is noted that the power saving techniques described above are operable with any wireless framework that designates synchronization messages sent from a relaying device for synchronizing transfer of multicast or broadcast traffic during a designated transmitting period. The wireless device 10 may avoid powering up according to one or all of the conditions for receiving different synchronization requests sent according to a non-802.11 protocol that does not include a DTIM count but that synchronizes multicast/broadcast transfer using some other scheme. In other embodiments, the requested synchronization events may not be communicated by signals such as beacons but instead occur according to a communication schedule that is preloaded onto each of the wireless device 10 and the AP 20.

Figure 2:
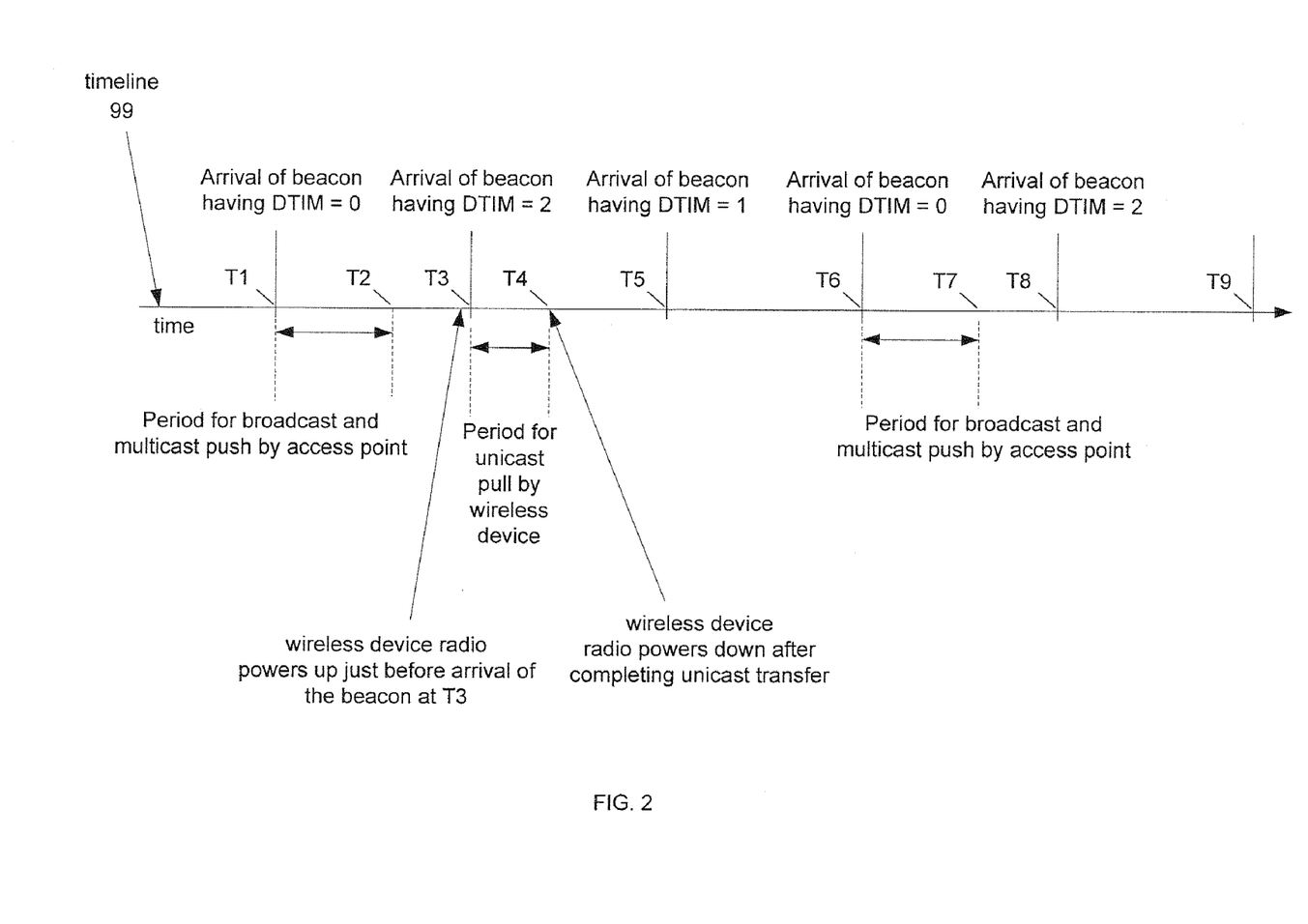
FIG. 2 illustrates an example timeline showing how the wireless device illustrated in FIG. 1 minimizes power usage.

FIG. 2 illustrates an example timeline showing how the wireless device illustrated in FIG. 1 minimizes power usage.

The timeline 99 shows when the wireless device 10 in the specific example described with respect to FIG. 1 powers up and powers down. Unlike conventional devices, the wireless device 10 does not power up its radio circuitry in anticipation of a time T1 for receiving a beacon synchronizing a DTIM zero event for synchronizing multicast transfer. These conventional devices may power down at time T2, or may remain powered up for a duration extending beyond time T2 to pull their respective unicast traffic.

In anticipation of arrival of a beacon with a DTIM count of two at time T3, the wireless device 10 powers up its radio circuitry and sends a request for a unicast pull if appropriate. The period between just before time T3 and time T4 may be very brief because an associated AP is not burdened with a multicast/broadcast push and is capable of immediately responding to a request for the unicast pull. Thus, the wireless device 10 receives the unicast pull relatively sooner after power up than conventional devices that generally must wait for the AP to process multicast transfers after power up. At the time T4 the wireless device 10 powers down the radio circuitry.

After arrival of a beacon with a DTIM count of one at a time T5, the wireless device 10 keeps its radio circuitry powered down in anticipation of arrival of the beacon signaling the DTIM zero event at a time T6. The wireless device 10 keeps its radio circuitry period down for the entire period defined by the time T6 and a time T7.

In anticipation of arrival of a beacon having a DTIM count of two at a time T8, the wireless device 10 may check a local power saving setting to determine whether to power up its radio circuitry. For example, to minimize latency in receiving buffered unicast traffic, a default setting for the wireless device 10 may power up the radio circuitry every DTIM=two (2) event. However, a non-default setting may allow a user to select a more aggressive power savings setting that causes the wireless device 10 to power up its radio circuitry at every other DTIM=two (2) event, or every third DTIM=two (2) event, every fourth DTIM=two (2) event, etc. The user setting may allow various different settings besides the default setting to allow the user to make choices concerning power saving and latency. Also, the setting may allow the user to regularly change between these selections based on time of day, etc.

In this example, the wireless device 10 has been set by a user for more aggressive power savings at the cost of some latency. Therefore, the wireless device 10 still keeps its radio circuitry powered down and does not power up the radio circuitry again until anticipating the next DTIM=two (2) event or later. Thus, in this example for the entire duration during the time T1 and the time T9 (and beyond) the wireless device 10 only powers up and down its radio circuitry for one brief period.

It should be apparent that power savings are realized over conventional techniques in several ways. Power savings are realized in the above example because the wireless device 10 may cause power up less frequently, for example every sixth beacon instead of every third. Power savings are also realized because the durations of the power ups are shorter (because at a non-zero DTIM event the unicast pull does not need to wait for the AP to process the multicast/broadcast push.) Power savings are also realized because the wireless device 10 minimizes power ups for long periods of time when there is no unicast traffic buffered for it.

Figure 3:
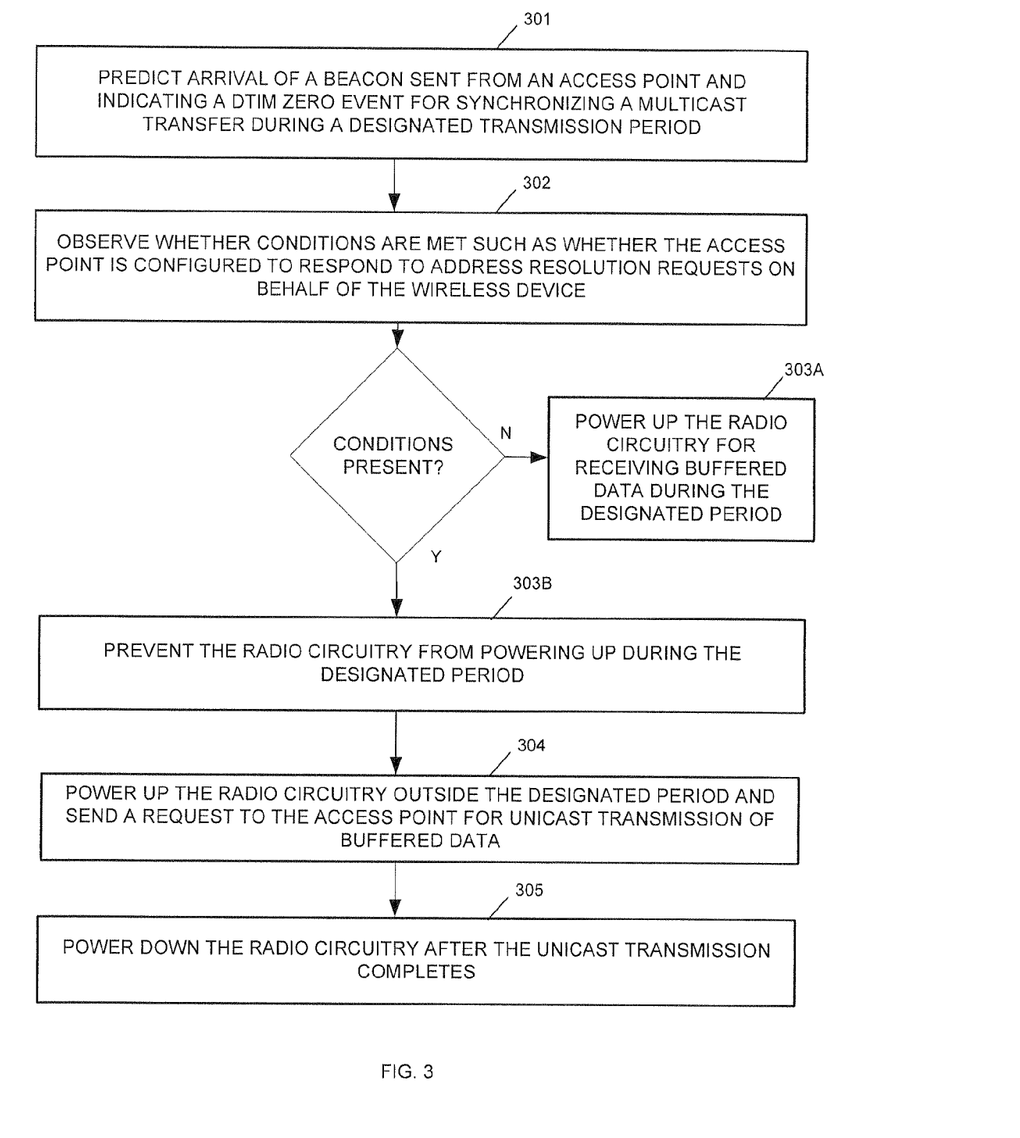
FIG. 3 illustrates an example method for using the wireless device illustrated in FIG. 1.

FIG. 3 illustrates an example method for using the wireless device illustrated in FIG. 1.

In block 301, the wireless device 10 predicts arrival of a beacon sent from an access point and indicating a DTIM zero event for synchronizing a multicast transfer during a designated transmission period. The wireless device 10 also determines whether conditions are met such as whether the access point is configured to respond to address resolution requests on behalf of the wireless device in block 302. As described previously, other conditions include whether the wireless device 10 is set to filter out multicast traffic or whether the access point is configured to periodically send other synchronization signals that do not request power up of radio circuitry for pushes from the access point. When the conditions are not present, in block 303A the wireless device 10 powers up the radio circuitry for receiving buffered data during the designated period.

When the conditions are present, in block 303B the wireless device 10 prevents the radio circuitry from powering up during the designated period. In block 304, the wireless device 10 powers up the radio circuitry outside the designated period and sends a request to the access point for unicast transmission of buffered data. As described previously, the wireless device 10 may send the request at the subsequent non-zero DTIM event or may wait longer so that any number of DTIM intervals complete before sending the request. Also as previously described this block 303B may be contingent on the AP indicating that it is presently buffering data for the wireless device 10. The wireless device 10 powers down the circuitry after the unicast transmission completes in block 305.

Figure 4:
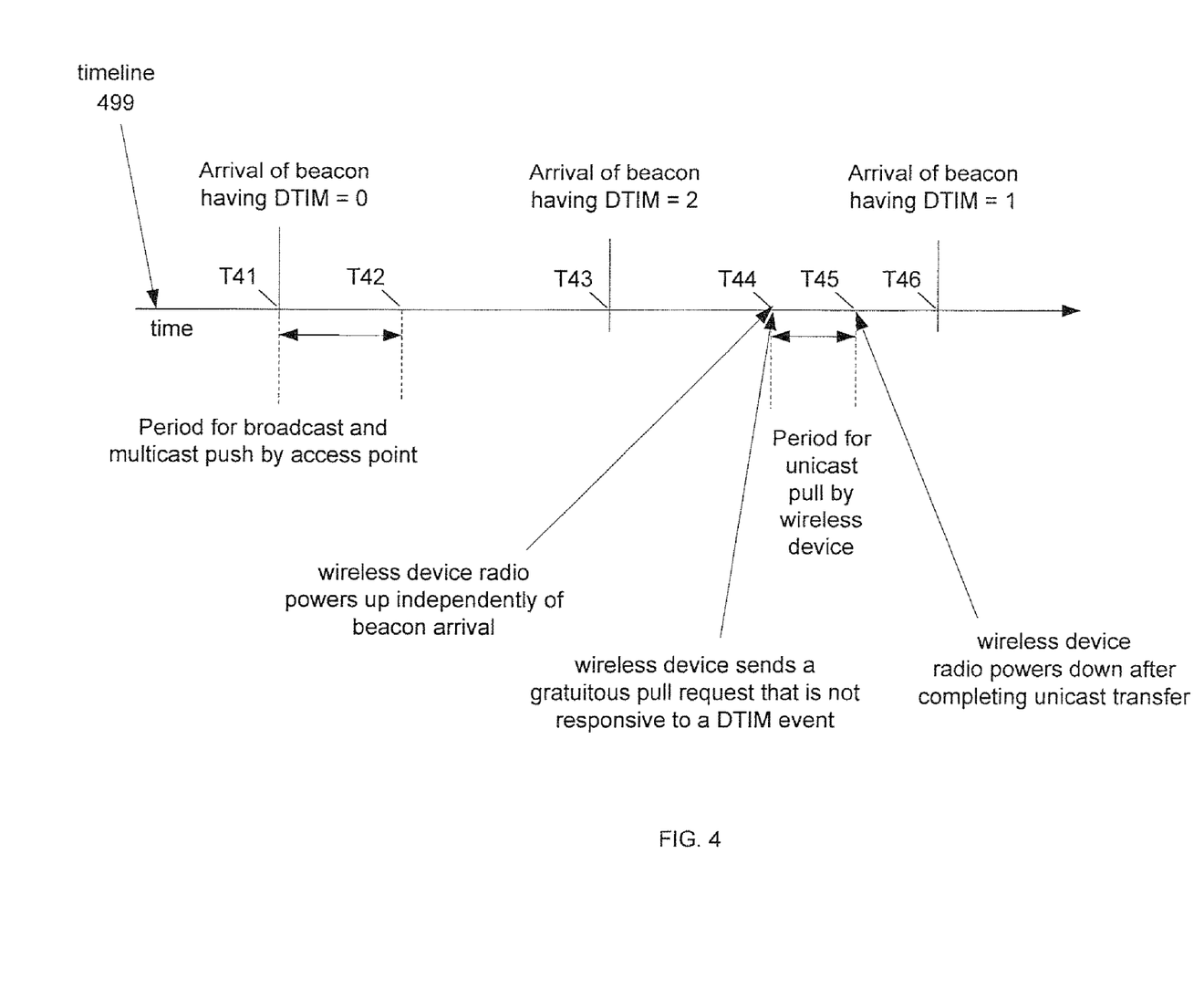
FIG. 4 illustrates another example timeline showing how a different wireless device minimizes power usage using gratuitous pull requests.

FIG. 4 illustrates another example timeline showing how a different wireless device minimizes power usage using gratuitous pull requests.

The timeline 499 illustrates how a different example wireless device also reduces power consumption over conventional devices. This example wireless device selects a time for sending gratuitous pull requests independently of beacon arrival.

For example, at a time T41 a beacon arrives with a DTIM count of zero. Like the previously described wireless device, this wireless device stays powered down through this period (time T41 through time T42) when certain conditions are present. In this example, the wireless device determines whether the associated AP is proxy ARP capable and whether an input indicates that multicast traffic is not desired. When these two conditions are present, the wireless device keeps its radio powered down throughout the designated period for scheduled transfer from the AP. In other words, unlike the previously described wireless device, this wireless device utilizes gratuitous pull requests and stays powered down at DTIM zero regardless of whether the DTIM interval is greater than one. The gratuitous pull request may be a PS-poll or a trigger frame and preferably allows the wireless device to remain in a power saving protocol state.

This example wireless device keeps its radio circuitry powered down regardless of anticipation of the other non-zero DTIM events occurring at times T43 and T46. Instead, at some other time such as time T44 the wireless device causes its radio circuitry to power up for a brief period. Preferably immediately after powering up the radio circuitry, the wireless device sends a gratuitous pull request. Unlike the previous example, this wireless device does not necessarily receive an indication that unicast wireless traffic is buffered at the AP before sending the request. If unicast traffic is buffered, the wireless device receives back a unicast transfer and powers down upon completion at a time T45. If unicast traffic is not buffered, the wireless device may receive back an indication that there is no unicast traffic buffered (such as a reply with null data), in which case the wireless device preferably immediately powers down the radio circuitry.

The time selected by the wireless device to power up the radio circuitry may be completely arbitrary. Preferably, the time is selected to occur outside the designated period for unsolicited/unrequested transfers from the AP so that the gratuitous request is processed immediately and not burdened by the processing of multicast traffic. Accordingly, when this example device is associated with an AP that uses a DTIM interval of zero, the selected time occurs between DTIM zero events.

Figure 5:
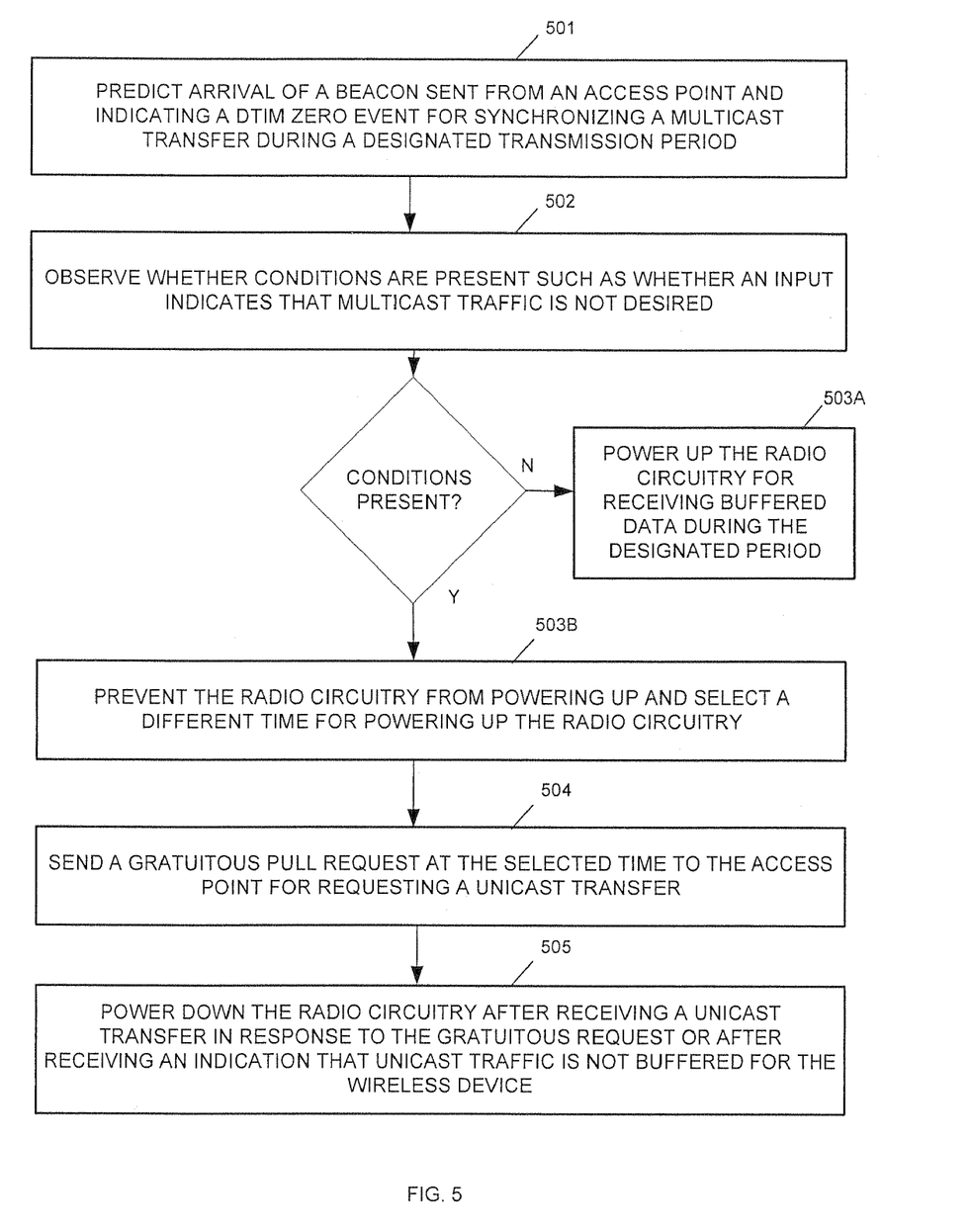
FIG. 5 illustrates an example method for using the different wireless device described with reference to FIG. 4.

FIG. 5 illustrates an example method for using the different wireless device described with reference to FIG. 4.

In block 501, the wireless device predicts arrival of a beacon sent from an access point and indicating a DTIM zero event for synchronizing a multicast transfer during a designated transmission period. The wireless device also determines whether conditions are present such as whether an input indicates that multicast traffic is not desired in block 502. When the conditions are not present, in block 503A the wireless device powers up the radio circuitry for receiving buffered data during the designated period.

When the conditions are present, in block 503B the wireless device prevents the radio circuitry from powering up during the designated period and selects a different time for powering up the radio circuitry. The selected time may occur on a non-zero DTIM event or at any other time in between any DTIM events. At the selected time, in block 505 the wireless device powers down the radio circuitry after receiving a unicast transfer in response to the gratuitous request or after receiving an indication that unicast traffic is not buffered for the wireless device.

As used throughout the following claims the term multicast is meant to encompass messages that are both transmitted to a multicast group or that are broadcast to all associated wireless devices. In other words, the term multicast as used in the claims refers to a non-unicast transmission. It is noted that examples of the above described disclosure may power up radio circuitry during the DTIM zero period regardless of observed conditions when the wireless device is actively involved in a call.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A system, comprising:
   means for orchestrating a designated period for radio circuitry in a plurality of wireless devices to power up for receiving an unsolicited transfer of buffered data from an access point;
   means for identifying which ones of the wireless devices are destination endpoints for the buffered data; and
   means for causing at least one of the identified wireless devices to selectively circumvent the power state change during the designated period and, outside the designated period, power up corresponding radio circuitry for sending a request for an unscheduled transfer of a corresponding portion of the buffered data from the access point;
   wherein the at least one identified wireless device keeps internal radio circuitry idle during a Delivery Transmit Interval Message (DTIM)-zero event and requests the corresponding portion of the buffered data via a unicast transmission during a non-zero DTIM event.

2. The system of claim 1, further comprising:
   means for determining whether a setting indicates that multicast transfers are not desired for the at least one identified wireless device; and
   means for selectively circumventing the power state change during the designated period according to whether the setting indicates that multicast transfers are not desired for the at least one identified wireless device.

3. The system of claim 1, further comprising:
   means for identifying a DTIM interval used by the access point; and
   means for selectively circumventing the power state change during the designated period according to whether the DTIM interval is greater than one.

4. The system of claim 1, further comprising:
   means for determining whether the access point is configured to respond to address resolution messages on behalf of the at least one identified wireless device; and
   means for selectively circumventing the power state change during the designated period according to whether the access point is configured to respond to address resolution messages on behalf of the at least one identified wireless device.

5. The system of claim 1, wherein the at least one identified wireless device is configured to send requests for unscheduled transfers periodically according to a regular interval that occurs less frequently than designated transfer periods.

6. The system of claim 1, wherein the wireless devices are 802.11 wireless devices.

7. The system of claim 1, wherein the request is sent independently of any DTIM events.

8. A wireless device, comprising:
   a processing device; and
   a memory coupled to the processing device comprising instructions executable by the processing device, when executing the instructions, the processing device is configured to:
   receive an input indicating whether receipt of multicast traffic on the wireless device is desired; and
   selectively prevent power up of radio circuitry in the wireless device when the input indicates that receipt of the multicast traffic is not desired;
   wherein if the radio circuitry powers up, a particular signal for synchronizing transfers of buffered data from an associated access point to the wireless device during a period designated for unsolicited transfers from the associated access point to the wireless device is received; and
   wherein if the radio circuitry remains in an idle state, the particular signal is transmitted from the associated access point for receipt by the wireless device but is not received at the wireless device;
   wherein the processing device is further configured to:
   determine a Delivery Transmit Interval Message (DTIM) interval used by the associated access point; and
   cause the radio circuitry in the wireless device to remain in the idle state so that the particular signal is not received when the input indicates that receipt of the multicast traffic is not desired, the associated access point is configured to respond to address resolution messages on behalf of the wireless device, and the DTIM interval is greater than one.

9. The wireless device of claim 8, wherein the processing device is further operable to:
  determine whether the associated access point is configured to respond to address resolution messages on behalf of the wireless device; and
  cause the radio circuitry in the wireless device to remain in the idle state so that the particular signal is not received when the associated access point is configured to respond to address resolution messages on behalf of the wireless device and receipt of the multicast traffic is not desired.

10. The wireless device of claim 8, wherein the processing device is further configured to:
  cause the radio circuitry to leave the idle state outside the designated period and before arrival of a different signal from the associated access point; and
  request a unicast transmission of buffered data outside the designated period and from the associated access point after receiving the different signal.

11. The wireless device of claim 10, wherein the processing device is further configured to cause the radio circuitry to return to the idle state after receiving the unicast transmission.

12. The wireless device of claim 11, wherein the processing device is further configured to cause the radio circuitry to remain idle at a transmission time of a beacon that includes a DTIM zero count and to leave the idle state in anticipation of receiving a beacon that includes a non-zero DTIM count.

13. A method, comprising:
  receiving an input indicating whether a relaying device is configured to respond to address resolution request messages on behalf of a wireless device;
  selectively preventing power up of radio circuitry in the wireless device when the input indicates that the relaying device is configured to respond to address resolution request messages on behalf of the wireless device;
  wherein if the radio circuitry powers up, a particular signal for synchronizing transfers of buffered data from the relaying device to the wireless device during a period designated for unsolicited transfers from the relaying device to the wireless device is received;
  wherein if the radio circuitry remains in an idle state, the particular signal is transmitted from the relaying device for receipt by the wireless device but is not received at the wireless device;
  determining whether a Delivery Transmit Interval Message (DTIM) interval configured on the relaying device is greater than one; and
  selectively preventing power up of the radio circuitry only when the relaying device is configured to respond to address resolution request messages on behalf of the wireless device, multicast traffic is not desired, and the DTIM interval is greater than one.

14. The method of claim 13, further comprising:
  observing the same or another input to determine whether multicast traffic is desired; and
  selectively preventing power up of the radio circuitry only when the relaying device is configured to respond to address resolution request messages on behalf of the wireless device and multicast traffic is not desired.

15. The method of claim 13, further comprising:
  selecting a time for sending a gratuitous request for any unicast traffic buffered on the relaying device for the wireless device;
  powering up the radio circuitry and sending the gratuitous request at the selected time; and
  powering down the radio circuitry after receiving either a unicast transfer from the relaying device or an indication that the unicast traffic is not buffered.

16. The method of claim 13, further comprising:
  predicting arrival of a different synchronization signal that includes a non-zero DTIM count;
  powering up the radio circuitry to receive the different synchronization signal with the non-zero DTIM count;
  observing the received different synchronization signal to determine whether unicast traffic is buffered for the wireless device; and
  requesting a unicast transfer when the received different synchronization signal indicates that the unicast traffic is buffered on the relaying device.

17. The method of claim 16, further comprising immediately powering down the radio circuitry when the received different synchronization signal indicates that unicast traffic is not buffered on the relaying device.

18. An apparatus, comprising:
  a processing device; and
  a memory coupled to the processing device comprising instructions executable by the processing device, when executing the instructions, the processing device is configured to:
  orchestrate a designated period for radio circuitry in a plurality of wireless devices to power up for receiving an unsolicited transfer of buffered data from an access point;
  identify which ones of the wireless devices are destination endpoints for the buffered data; and
  cause at least one of the identified wireless devices to selectively circumvent the power state change during the designated period and, outside the designated period, power up corresponding radio circuitry for sending a request for an unscheduled transfer of a corresponding portion of the buffered data from the access point;
  wherein the at least one identified wireless device keeps internal radio circuitry idle during a Delivery Transmit Interval Message (DTIM)-zero event and requests the corresponding portion of the buffered data via a unicast transmission during a non-zero DTIM event.

19. The apparatus of claim 18, wherein the processing device is further configured to:
  determine whether a setting indicates that multicast transfers are not desired; and
  selectively circumvent the power state change during the designated period according to whether the setting indicates that multicast transfers are not desired.

20. The apparatus of claim 18, wherein the processing device is further configured to:
  identify a DTIM interval used by the access point; and
  selectively circumvent the power state change during the designated period according to whether the DTIM interval is greater than one.

21. The apparatus of claim 18, wherein the processing device is further configured to:
  determine whether the access point is configured to respond to address resolution messages on behalf of a particular network device; and
  selectively circumvent the power state change during the designated period according to whether the access point is configured to respond to address resolution messages on behalf of the particular network device.

22. A method, comprising:

orchestrating a designated period for radio circuitry in a plurality of wireless devices to power up for receiving an unsolicited transfer of buffered data from an access point;

identifying which ones of the wireless devices are destination endpoints for the buffered data; and causing at least one of the identified wireless devices to selectively circumvent the power state change during the designated period and, outside the designated period, power up corresponding radio circuitry for sending a request for an unscheduled transfer of a corresponding portion of the buffered data from the access point;

wherein the at least one identified wireless device keeps internal radio circuitry idle during a Delivery Transmit Interval Message (DTIM)-zero event and requests the corresponding portion of the buffered data via a unicast transmission during a non-zero DTIM event.

23. The method of claim 22, further comprising:

determining whether a setting indicates that multicast transfers are not desired; and selectively circumventing the power state change during the designated period according to whether the setting indicates that multicast transfers are not desired.

24. The method of claim 22, further comprising:

identifying an event interval used by the access point; and selectively circumventing the power state change during the designated period according to whether the event interval is greater than a predetermined value.

25. The method of claim 22, further comprising:

determining whether the access point is configured to respond to address resolution messages on behalf of a particular network device; and selectively circumventing the power state change during the designated period according to whether the access point is configured to respond to address resolution messages on behalf of the particular network device.

* * * * *